Figure 1:
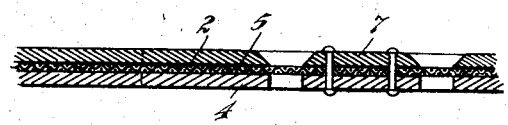

No. 839,187. PATENTED DEC. 25, 1906.
W. B. NORTON.
PROCESS OF ORNAMENTING HOT GLASS OR METAL.
APPLICATION FILED SEPT. 19, 1904.

WITNESSES
INVENTOR
William B. Norton
By Parker W Burton Attorneys.

UNITED STATES PATENT OFFICE.

WILLIAM B. NORTON, OF DETROIT, MICHIGAN.

PROCESS OF ORNAMENTING HOT GLASS OR METAL.

No. 839,187.        Specification of Letters Patent.        Patented Dec. 25, 1906.

Application filed September 19, 1904. Serial No. 224,943.

*To all whom it may concern:*

Be it known that I, WILLIAM B. NORTON, a citizen of the United States, residing at Detroit, county of Wayne, State of Michigan, have invented a certain new and useful Improvement in Processes of Ornamenting Hot Glass or Metal; and I declare the following to be a full, clear, and exact description of the invention, such as will enable others skilled in the art to which it pertains to make and use the same, reference being had to the accompanying drawings, which form a part of this specification.

This invention relates to a process of ornamenting glass or hot metal.

It has for its object an improved method of producing ornamental figures or designs upon the surface of either glass or metal, and especially upon glass.

In carrying out the process the metal to be ornamented (and I include in the term "metal" any material that is suitable for the ornamentation in question and can be heated to a temperature sufficiently high to melt the ornamenting material) is heated, the ornamenting material is selected, reduced to a fine powder, and is applied through a stencil in which the openings are through wire-gauze arranged between plates, through which plates there are openings in the form of the ornament to be produced. The plate on the under side of the wire-gauze is thick as compared with the plate on the upper side, and the walls of each opening through the thicker under plate form confining-walls that direct the dust which has sifted through the gauze and cause it to take its position on the article under treatment with sharper and more defined outlines. In applying the dust the box in which the dust is contained and on the bottom of which the stencil is placed is held as securely as possible from moving, and the dust is caused to escape by jarring or tapping the box and producing a sharp but almost infinitesimal movement thereof.

The article to be treated having been heated to a temperature to melt the particles of dust is placed under the box of dust and the dust sifted on it in the way mentioned. Immediately the dust melts, forming figures or characters which become rounded on their upper surface because of the cohesion of the melted particles and which adhere strongly to the heated article and continue to adhere strongly to the heated article after it cools. If the article to be ornamented be glass, the dust particles, which are also of glass in this case, become partially fused into the base and the article and the ornamental figures thereon become one constituent article and not a base with an adherent ornamentation. If the article to be ornamented be iron and the ornamental dust be glass, the ornamentation adheres as a glazing. The invention, however, is not confined to any particular class of articles or any particular class of ornamenting material, but consists in the method of applying the ornamental material in the way described to a base which is brought to a condition to cause the ornamental material to adhere to it.

Although the mechanical features and improvements embodied in this invention form the subject of another application, it is thought that the process here described will be more clearly understood by reference to the accompanying drawings, in which—

Figure 2:
Figure 3:
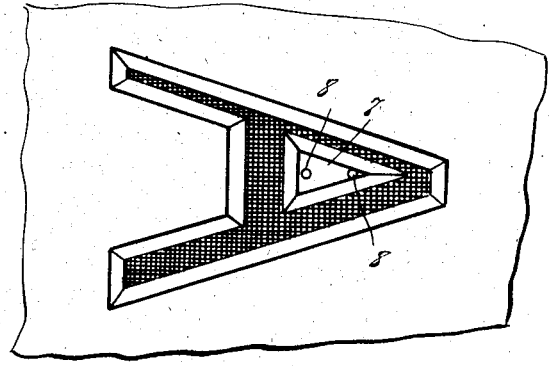

Figure 1 shows a section through a stencil-plate. Fig. 2 shows a section through a stencil-plate differing in construction. Fig. 3 shows a plan of the stencil of which a section is shown in Fig. 1.

As stated above, the stencil-plate is of three layers, of which the inner layer 2 on the upper side of the stencil is thin sheet metal, or if it be made of thicker material, as shown in Fig. 1, it has the edges of the openings beveled to furnish the greatest possible clearance for the dust that is contained in the box. The bottom plate or outside plate 4 is thick, and the walls of the openings continue through the plate, making an opening of uniform width. The middle plate 5 is of thin gauze, and wherever there are letters with detached centers or annular openings the central or core parts 7 of said annular openings are made by riveting the inner and outer plates together, with the rivet 8 passing through the mesh of the screen.

With the inner plate made thin or made with beveled sides to the stencil-openings the dust shakes away from the screen and does not pack and prevent the free passage through the screen.

What I claim is—

1. The process of ornamenting a mineral article, consisting in heating the article to a temperature to fuse pulverized ornamenting material coming in contact therewith, and applying said material in the form of a dust through a stencil whose openings are covered with wire-gauze, said dust being caused to fall therethrough and upon said article by repeated sharp jarrings of negligible displacing degree, and being guided in its fall upon the intended portion of the mineral article by the edges of that part of the stencil adjacent to said gauze-covered openings and beneath the plane of the gauze covering, substantially as described.

2. The process of ornamenting an article with fusible material, consisting in heating the article to be ornamented to a temperature to fuse the ornamenting material, and applying said ornamenting material in the form of a dust from a stencil having openings of the shape of the design desired, which openings are covered with wire-gauze and the edges of which beneath the gauze serve to guide the dust in its descent, precipitation of said dust through said gauze being effected by repeated tapping upon the stencil member, substantially as described.

3. The process of ornamenting an article, consisting in heating the article to be ornamented to a temperature to fuse the ornamenting material, applying the ornamenting material in the form of a dust by sifting the same through a stencil-like screen, producing the requisite motion for delivering the dust through the screen by repeated jarring and guiding the dust to its place of deposit after it leaves the screen and between the screen and its final place of deposit, substantially as described.

4. The process of ornamenting an article with fusible material, consisting in heating the article to be ornamented to a temperature to fuse the ornamenting material, applying the ornamenting material to the article in the form of dust or fine powder, which is delivered through a screen and guided between the screen and the ornamented article, substantially as described.

In testimony whereof I sign this specification in the presence of two witnesses.

WILLIAM B. NORTON.

Witnesses:
MAY E. KOTT,
CHARLES F. BURTON.